United States Patent [19]

Covington

[11] Patent Number: 4,688,161
[45] Date of Patent: Aug. 18, 1987

[54] REGULATED POWER SUPPLY APPARATUS AND METHOD USING REVERSE PHASE ANGLE CONTROL

[75] Inventor: John H. Covington, Carrollton, Tex.

[73] Assignee: Vari-Lite, Inc., Dallas, Tex.

[21] Appl. No.: 887,367

[22] Filed: Jul. 16, 1986

[51] Int. Cl.$^4$ .......................................... H02M 5/458
[52] U.S. Cl. .................................... 363/37; 323/235; 323/239; 323/242; 363/89; 363/98
[58] Field of Search ...................... 363/36, 37, 80, 81, 363/89, 98; 323/239, 242, 272, 235, 319, 266; 315/206, 224, 226

[56] References Cited

U.S. PATENT DOCUMENTS

| | | | |
|---|---|---|---|
| 3,538,418 | 11/1970 | Allington | 363/89 |
| 3,758,840 | 9/1973 | Oliver | 363/36 |
| 4,086,526 | 4/1978 | Grudelbach | 323/319 |
| 4,528,494 | 7/1985 | Bloomer | 323/235 |
| 4,567,425 | 1/1986 | Bloomer | 323/235 |

FOREIGN PATENT DOCUMENTS

| | | | |
|---|---|---|---|
| 85120 | 7/1981 | Japan | 323/239 |
| 142624 | 8/1983 | Japan | 323/235 |

OTHER PUBLICATIONS

Burkhart et al, "Reverse Phase-Controlled Dimmer for Incandescent Lighting," IEEE Trans. on Ind. App's., vol. 1A-15, No. 5, (Sep./Oct. 1979).

Primary Examiner—William H. Beha, Jr.
Attorney, Agent, or Firm—Richards, Harris, Medlock & Andrews

[57] ABSTRACT

A power converter for converting 60 Hertz line power to 20 kilohertz power for driving a low voltage incandescent lamp (42). A field effect transistor power switch section (12) is connected through bridge rectifiers (10, 32) for charging a capacitor filter (34) with the AC input power. A 20 kHz oscillator (38) drives a half-bridge inverter (36) for coupling the capacitor voltage to the lamp (42) as high frequency power. The conduction of the FET power switch (12) is controlled by a phase locked loop (16) for synchronizing the conduction with the zero crossing points of the AC cycle. A ramp generator (18) and a summing network (20) are responsive to a lamp intensity control (22) for changing the conduction duty cycle of the FET power switch (12) such that a desired lamp intensity is maintained.

3 Claims, 8 Drawing Figures

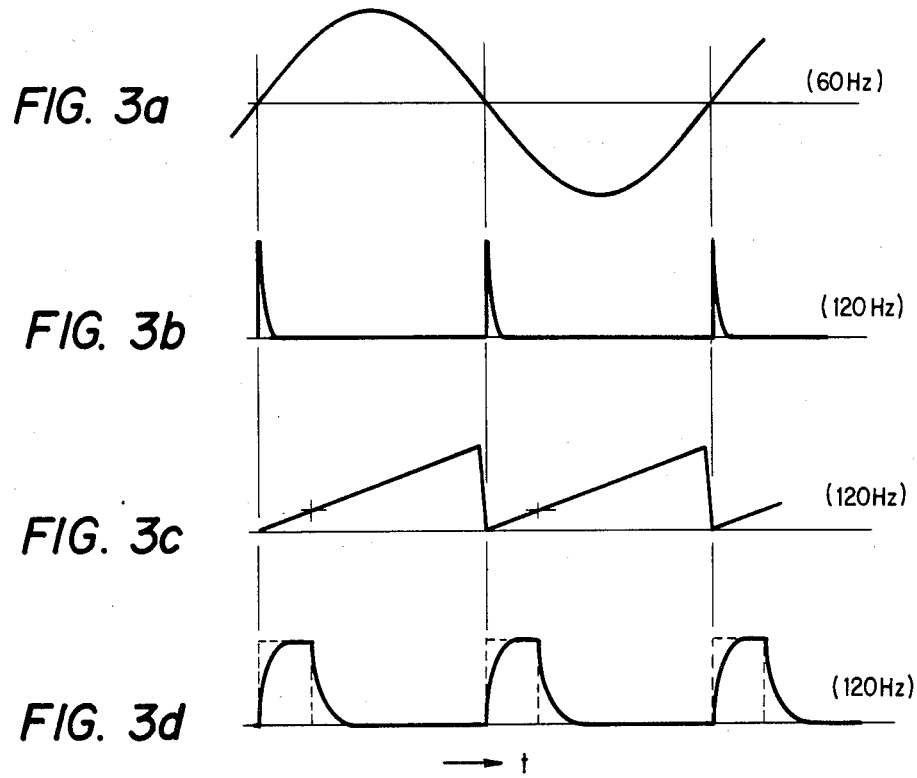
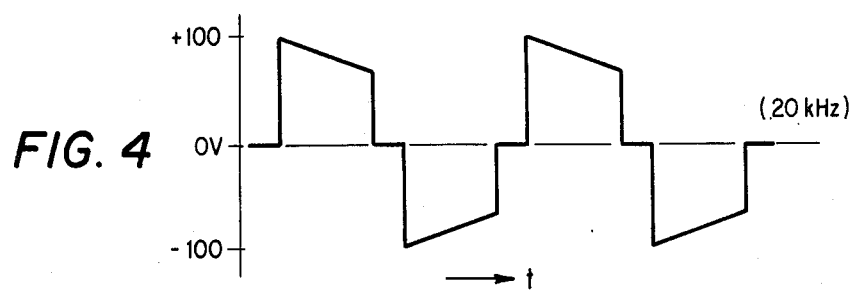

REGULATED POWER SUPPLY APPARATUS AND METHOD USING REVERSE PHASE ANGLE CONTROL

TECHNICAL FIELD

The present invention relates to electrical power supply circuitry, and, more particularly, to a converter circuit for converting input AC line power to higher frequency output AC power.

BACKGROUND OF THE INVENTION

Most nonspecialized home and industrial electrical apparatus in the United States is driven either by 110 volt or 220 volt AC, 60 cycle per second power. Many applications require AC electrical power with either a frequency different from 60 cycles, or a voltage other than 110 or 220 volts AC. For example, stage lighting systems often require low voltages, but high power. In generating AC electrical power with a frequency or voltage magnitude different from the standard line power, it is conventional to use a transformer for isolation purposes, as well as to provide an increase or decrease in the magnitude of the voltage. However, when used in connection with 60 cycle power, a rather large iron-core transformer must generally be used, thus presenting space and weight problems in such systems as stage lighting apparatus. In addition, when a highly regulated AC output voltage is required, additional regulation circuitry must be used.

U.S. Pat. Nos. 3,237,082 and 3,930,193 disclose converters with regulated output parameters. Disclosed in U.S. Pat. No. 3,360,710 is a converter for providing an output frequency which is adjustable, and which is independent of the input AC line voltage frequency. Provisions are also disclosed in the latter-mentioned patent for regulating the output AC voltage of a converter to a desired magnitude.

In each of the above-noted patents, the input AC voltage to the converter is rectified and filtered to produce a DC voltage, which is converted into the desired AC frequency and voltage. In the prior U.S. Pat. Nos. 3,237,082 and 3,930,193, rectifier diodes and a parallel capacitor provide a filtered DC voltage which is switchably controlled by a series pass transistor for feeding the DC voltage to an output AC generating section. In U.S. Pat. No. 3,360,710, silicon controlled rectifier (SCR) devices provide current to the DC filter section of the converter.

In the converters disclosed in U.S. Pat. Nos. 3,237,082 and 3,930,193, the input filter capacitors of the DC section are charged according to the amplitude of the rectified input AC voltage. The output voltage of these power supplies is controlled by circuits in the output section of the supplies. With regard to U.S. Pat. No. 3,360,710, the capacitor voltage of the DC filter section is controlled by the firing of the rectifying SCR devices. The shortcoming with using SCR devices is that once turned on, the devices remain on until the bulk current therethrough is reduced to zero. Therefore, in order to charge the filter capacitors to a predetermined voltage, the SCR must be triggered on at some point in the AC cycle and turned off when the AC current passes through a zero current point. The sudden conduction of the SCR causes an in-rush current, a large di/dt, to the capacitors which can cause long term damage to the electrolytic action of the capacitors. Conventional converters require large inductors to limit the rate of change of current (di/dt) in SCR systems. Such systems that have a rapid turn off further generate radio frequency interference and electromagnetic interference (RFI/EMI). The interference generated by converters of this type may exceed the allowable standards.

From the foregoing, it may be seen that a need has arisen for a converter which has neither large input transformers nor SCR devices, and thus can be housed in small enclosures such as stage lamp facilities. There is an associated need for a reliable power converter where the charging currents for the filter capacitors are synchronized with the input AC zero crossings, such that the capacitor charging rate is similar to the AC current as it increases from a zero crossing.

SUMMARY OF THE INVENTION

In accordance with the present invention, a circuit for converting an input AC power into another AC voltage is provided which substantially reduces or eliminates the disadvantages associated with the prior art techniques.

According to the invention, a power converter is provided having an input diode rectifier bridge coupled directly to the AC power line and a field effect transistor (FET) switch for transferring rectified AC current to a capacitor filter section. The FET transistor is driven in synchronism with the zero crossings of the AC power to charge the filter capacitor at a rate corresponding to the dv/dt of the AC source. A phase locked loop is employed for synchronizing the timing of the FET switch with the AC sinusoidal signal.

In the preferred form of the invention, the power converter is connected to a tungsten lamp, and the intensity thereof is controlled by the amount of charge on the filter capacitors. Essentially, the FET transistor is switched into a conductive state for a period of time sufficient to charge the filter capacitor to a voltage corresponding to the desired lamp intensity.

An FET drive section comprises a ramp voltage generator which floats on a DC level and is triggered as the AC 60 cycle power goes through zero crossings. The DC level of the ramp voltage is varied based upon the setting of a lamp intensity control. The DC bias ramp voltage is compared with a reference voltage so that output pulses are produced with a width corresponding to the setting of the intensity control. The pulses are coupled to the FET transistors, and the conduction period of such transistors is controlled by the width of the pulses. Importantly, the rise and fall times of the conduction current in the transistors are limited to provide a controlled in-rush current to the capacitors on each conduction cycle of the FET transistors. Further, the reduction in the rise and fall times of the conduction current reduces the generation of EMI/RFI.

The power to the tungsten lamp is monitored by sensing the lamp voltage and lamp current. Indications of a lamp overvoltage or overcurrent initiate action by which the conduction period of the FET switch is changed. Current through the FET switch is monitored to provide instantaneous shutdown should an excessive current flow. In the preferred form, plural FET transistors are connected in parallel and an overcurrent in any one such transistor is operative to reduce conduction in all the FET transistors. Overvoltage protection is also provided for the FET transistors in the event an excessive voltage is imposed across the transistors. For 220 volt operation, the overvoltage protection comprises a 350 volt zener diode from source to gate of the FET transistors, and a 10 volt zener from the gate to drain off the transistors.

The power stored by the DC filter section of the power converter is switched at a 20 kilohertz rate, through a transformer, to the tungsten lamp. With the use of a 20 kilohertz switching rate, the transformer size is not substantial, and the shape of the power waveform coupled to the tungsten lamp is not critical.

BRIEF DESCRIPTION OF THE DRAWINGS

For a more complete understanding of the present invention and the advantages thereof, reference is now made to the following description taken in conjunction with the accompanying Drawings, in which:

FIG. 3 (a-d) are a set of waveforms illustrating signals present in the circuit shown in FIGS. 2a and 2b; and FIG. 4 is a waveform illustrating a high frequency, low voltage power signal.

DETAILED DESCRIPTION OF THE INVENTION

Figure 1:
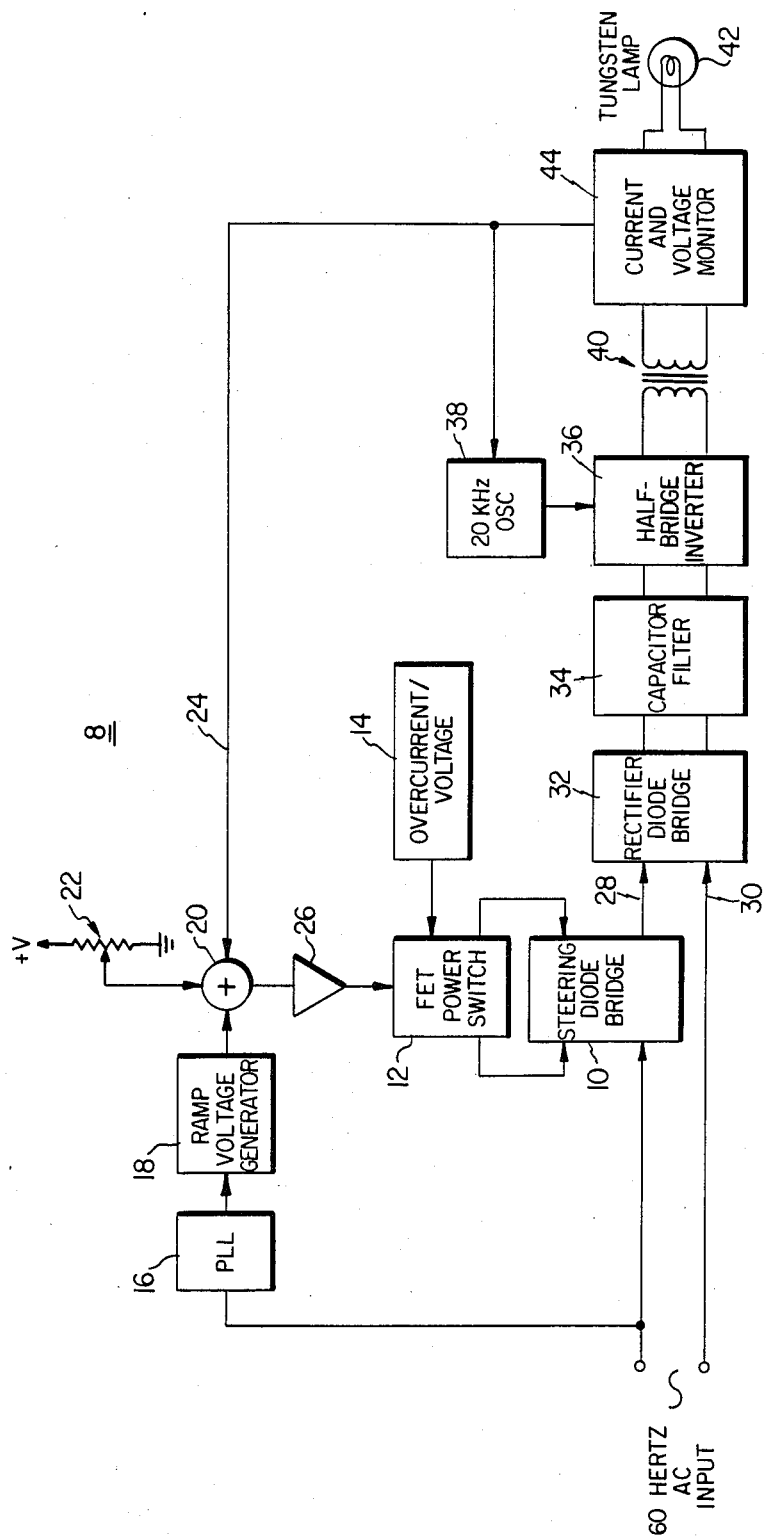
FIG. 1 is a block diagram of the power converter according to the invention.

The application and operation of the invention are best understood by referring first to FIG. 1 of the drawings which illustrates a power converter 8. A steering diode bridge 10 is connected with an FET power switch 12 to the 60 hertz AC input. The switch 12 and bridge 10 provide switched AC power to subsequent stages of the power converter. An overcurrent/voltage monitor 14 is connected to the power FET switch 12 to control conduction and assure that overcurrents or overvoltages do not damage the transistors in power FET switch 12. A phase locked loop 16 is also connected to the 60 hertz AC input for providing appropriate driving pulses to the FET power switch 12 in timed synchronism with the AC input. The output of the phase locked loop 16 triggers a ramp voltage generator 18. A summing network 20 combines the ramp voltage with the DC voltage of an intensity control 22, as well as the current and voltage indication of the tungsten lamp via line 24. Intensity control 22 provides an input signal for selecting the amplitude of voltage applied to the lamp load. An amplifier 26 processes the composite of these voltages and drives the power FET switch 12 with pulses having a 120 Hz rate and a duty cycle corresponding to the setting of the intensity control 22.

The switched AC power on conductor 28, and the other AC power conductor 30 are coupled to a rectifying diode bridge 32 for providing a rectified power signal to a capacitor filter 34. The capacitor filter 34 provides DC power to a half-bridge inverter 36. An independently controlled oscillator 38 drives inverter 36 at a 20 kilohertz rate, and thereby drives a transformer 40 with a 20 kilohertz power signal. The transformer 40 is coupled to the tungsten lamp 42 and thereby illuminates the lamp in accordance with the setting of the intensity control 22. The tungsten lamp 42 is of the type typically used in a stage light, usually operating around 40-50 volts and 400 watts. The power converter of the present invention is thus ideally suited for this low voltage, high power application.

A current and voltage monitor 44 senses the tungsten lamp power for proper operation. In the event an overcurrent is detected, the monitor 44 shuts down the 20 kilohertz oscillator 38 and overrides the summing network 20 to inhibit the generation of drive pulses to the FET power switch 12. Other circuits advantageous to the operation of the power converter will be described below in connection with the detailed description of the invention.

Figure 2A:
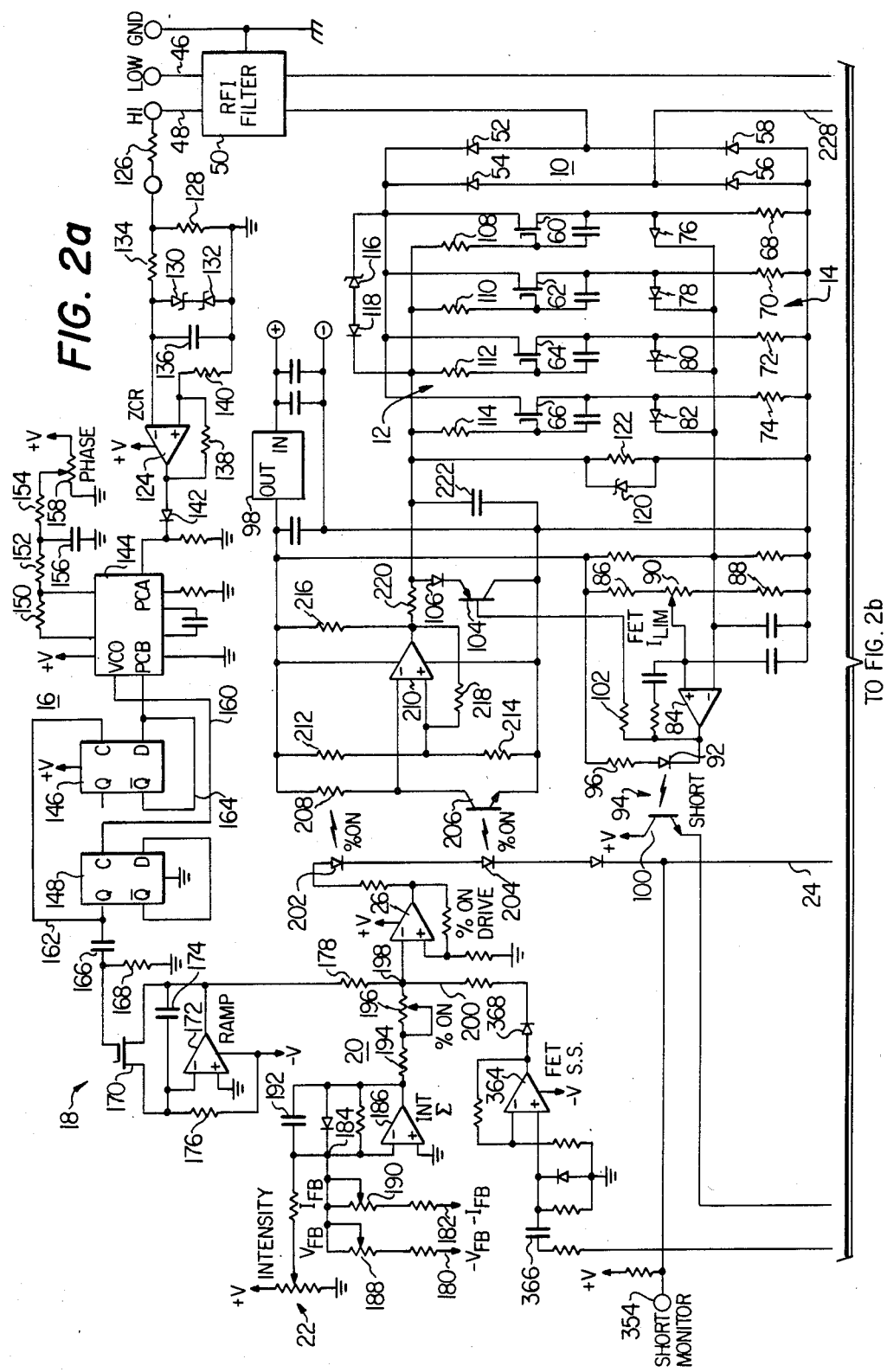
FIG. 2a and 2b, when joined, form a detailed electrical drawing of the preferred embodiment of the invention.
Figure 2B:
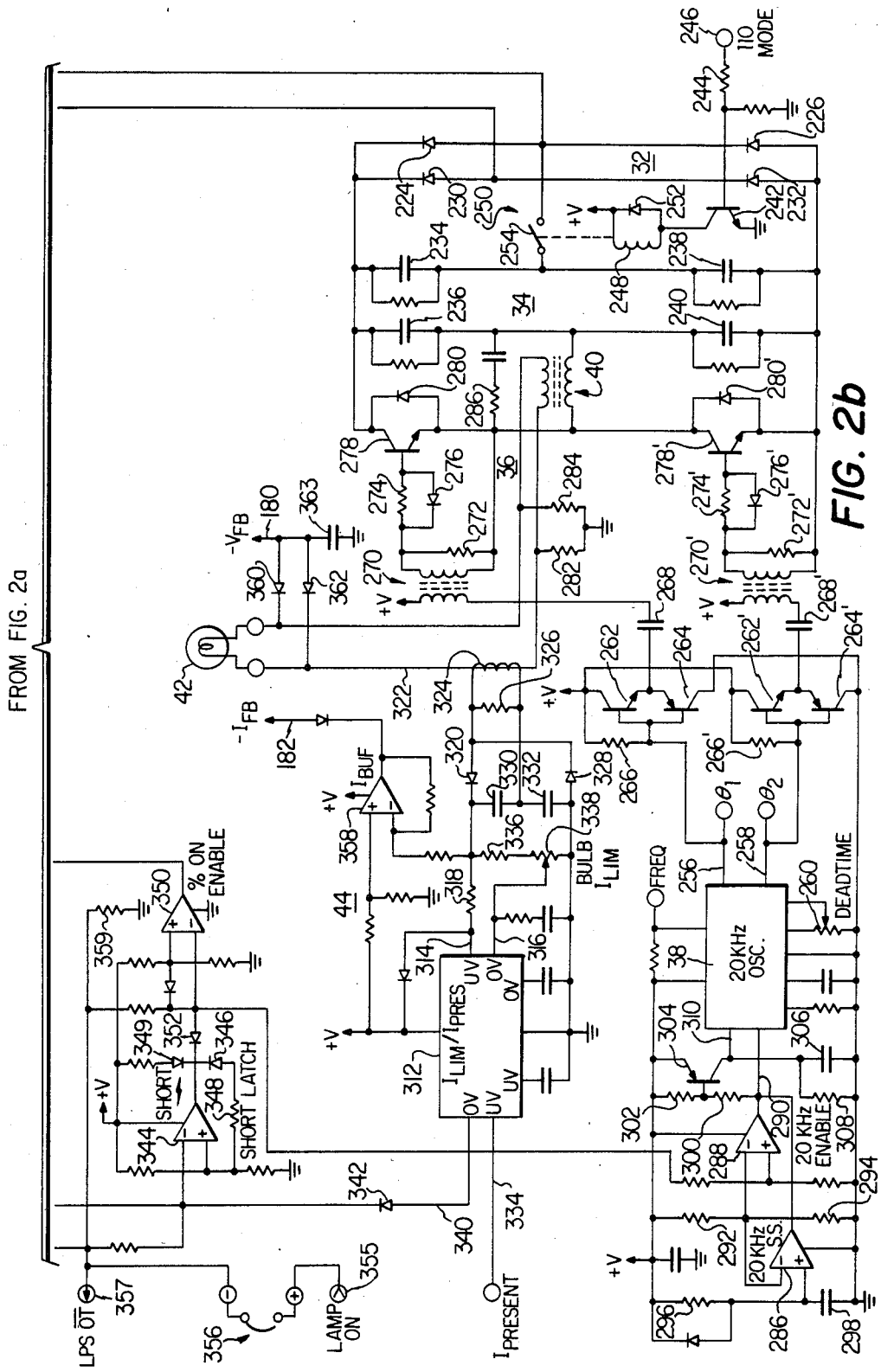

The detailed circuitry for the power converter 8 is illustrated in FIGS. 2a and 2b. Specific waveforms associated with this circuit are further illustrated in FIGS. 3 and 4.

Referring to FIGS. 2a and 2b, the AC conductors 46 and 48 of a 220 volt AC bus are coupled to a RFI filter 50 to reduce electromagnetic radiation and thereby reduce frequency interference with closely located electrical equipment. The hot lead, or high lead 48, of the 220 volt AC source is connected to the routing diode bridge 10 comprising diodes 52-58. One terminal of the diode bridge 10 is connected to the drain terminals of four FET power switches, designated by reference characters 60-66. The source terminals of the FET power switches 60-66 are connected through respective resistors 68-74 to the remaining terminal of the diode bridge 10. At the junction of each resistor 68-74 and the source terminal of the respective FET power transistors 60-66 are the anode terminals of four diodes 76-82. The cathode terminals of the diodes 76-82 are connected in common to the inverting input of an amplifier 84. The value of resistors 68-74 is associated with the maximum current desired to be carried by each FET power transistor 60-66. When the current through any one or more FET power transistors 60-66 reaches the maximum desired current, the voltage across the relevant resistor 68-74 causes a respective diode 76-82 to become forward biased. A resulting voltage is thus coupled to the input of amplifier 84.

There is provided at the noninverting input of amplifier 84 a reference voltage which is determined by series resistors 86, 88 and potentiometer 90. The setting of potentiometer 90 corresponds to the maximum desired current through the FET power transistor 60-66. When such a maximum current is detected the output of amplifier 84 switches from a high voltage state to a low voltage state. The output of amplifier 84 is connected through a light emitting diode 92 of an optical isolator 94, and through current limiting resistor 96 to an internal DC supply 98. Voltage supply 98 provides a low DC voltage of about 12 volts to the 220 volt section of the power converter.

An overcurrent condition detected for one of the FET power transistors 60-66 is optically coupled by diode 92 to a transistor 100 of the optical isolator 94. In this manner, the dangerously high voltage of the power section is isolated from other low voltage sections of the power converter, to be discussed in more detail below. The output of amplifier 84 is also coupled by a resistor 102 to the base of a transistor 104. The emitter of transistor 104 is connected through a plurality of parallel-connected resistors 108-114 to the respective gate terminals of FET power transistors 60-66. In this manner, an overcurrent condition reflected by the voltage across any of the resistors 68-74 is coupled via amplifier 84 and PNP transistor 104 to the inputs of FET power transistors 60-66. As a result, an overcurrent is quickly quenched without being processed circuitously, thereby improving the response time and assuring protection of the FET power transistors 60-66.

Overvoltage protection of the FET power transistors 60-66 is provided in part by zener diode 116 and conventional diode 118. The cathode of zener diode 116 is connected in common to all drain terminals of FET power transistors 60-66, and the anode of zener diode 116 is connected to the anode of diode 118. The cathode of diode 118 is connected to the common junction of resistors 108-114. Provided also as part of the overvoltage protection of the FET power transistors 60-66 is a parallel combination of zener diode 120 and resistor 122. The cathode of zener diode 120 is connected to the common junction of resistors 108-114, while the anode of zener diode 120 is connected to the common junction of current sensing resistors 68-74. For 220 volt AC operation, zener diode 116 has a reverse breakdown voltage of about 360 volts, while zener diode 120 has a reverse breakdown voltage of about 10 volts. When a voltage substantially greater than 360 volts appear across the source and drain terminals of the FET power transistors 60-66, zener diode 116 breaks down and diode 118 is forward biased, thereby increasing the drive through resistors 108-114 to FET power transistor 60-66. Diode 120 clamps the gate-source voltage of the FET power transistors 60-66 to about 10 volts. With this arrangement, momentary overvoltage conditions of the FET power transistors 60-66 result in increased drive thereof, thereby reducing the overvoltage condition. The breakdown voltage of zener diode 120 is chosen in accordance with the operating characteristics of the FET power transistors 60-66 such that the transistors are driven into the power mode portion of their operating characteristic curves.

With regard to the circuits for driving the FET power transistors 60-66 in synchronism with the 60 cycle source, there is provided a zero crossing amplifier 124 having an inverting input coupled by resistor 126 to the high voltage terminal 48 of the 220 volt AC source. (See FIG. 2a). Resistor 128 provides a reference of the AC voltage to ground. Zener diodes 130 and 132 are 10 volt diodes coupled back to back from the inverting input of amplifier 124 to ground. Zener diodes 130 and 132 provide a clipped sine wave of about ±11 volts to the input of amplifier 124. Resistor 134 and capacitor 136 provide a filter for eliminating the high frequency components which might accompany the 60 hertz input signal.

Amplifier 124 is of the type having a high gain. The value of resistors 138 and 140 provides feedback of about one percent of the amplifier output voltage. Accordingly, a hysteresis ratio of 100:1 is provided to the amplifier 124. A diode 142 is connected to the output of amplifier 124 to provide halfwave rectified representations of the 60 hertz input to the phase locked loop circuit 16.

The phase locked loop circuit 16 comprises a phase locked loop integrated circuit 144 and a pair of D-type flip-flops 146 and 148 forming a divide-by-four counter. Integrated circuit 144 and the flip-flops 146 and 148 comprise respectively integrated circuit types CD4046B and CD4013, manufactured by RCA Corp. Resistors 150-154, and capacitor 156, together with potentiometer 158 provide a phase adjustment to the phase locked looped integrated circuit 144. The phase adjusting potentiometer 158 allows all accumulated phase delays between the FET power switch 12 and the 60 hertz power source to be offset. The major contributors of phase delay occur as a result of the high frequency filter comprising capacitor 136 and resistor 134. In any event, phase adjusting potentiometer 158 is manually adjusted so that after all delays in the circuit have been taken into consideration, the FET power transistors 60-66 begin conduction at the point coincident with the zero crossing of the 60 hertz power source.

In accordance with conventional principles of phase locked loop circuits, a 240 hertz output signal is provided by the circuit 144 on conductor 160. Flip-flop 148 is a divide-by-two circuit, thereby providing a 120 hertz signal on conductor 162. The signal on conductor 162 is coupled to the input of flip-flop 146, and in like manner, flip-flop 146 provides a 60 hertz square wave on conductor 164. In accordance with general operating principles of phase locked loops, the 120 hertz square wave on conductor 162 is maintained in a predetermined phase relationship with the 60 hertz input provided by amplifier 124. Importantly, there are two zero crossings for every 60 hertz cycle. Therefore, the output of the phase locked loop 16 is a 120 hertz square wave on conductor 162.

Continuing with the signal generation circuit for the FET power transistors 60-66, the 120 hertz signal on conductor 162 is differentiated by capacitor 166 and resistor 168. The resultant differentiated signal is coupled to the gate terminal of an FET 170. However, the gate terminal is responsive only to the positive portions of the differentiated signal, and thus conducts only during the brief period of the positive differentiated spike. Thus, only the positive spikes are shown in FIG. 3b. The FET 170 is connected across a ramp voltage generator 18 which includes amplifier 172. A capacitor 174 is connected between the output of the amplifier and the inverting input thereof. The noninverting input is connected to ground, while a resistor 176 is connected between the inverting input and the negative supply voltage. With this arrangement, as capacitor 174 charges, the output of the amplifier goes from zero volts toward the positive 15 volt supply. The values of capacitor 174 and resistor 176 are chosen such that the transistion from zero volts to 15 is substantially complete during a half cycle of a 60 hertz input signal.

At a point somewhat preceeding the zero crossings of the 60 hertz signal, transistor 170 is driven into conduction for a very short period of time to discharge capacitor 174. This initiates the generation of a ramp voltage, starting from zero volts. The waveform for the ramp produced by amplifier 170 is shown in FIG. 3c.

The ramp voltage generator 18 is coupled to a summing network 20 by resistor 178. The summing network 20 also combines the DC inputs from the intensity control 22, and lamp voltage and current information via conductors 180 and 182. Node 184 combines these DC voltages for input to the inverting terminal of an intensity summing amplifier 186. A composite signal of the intensity setting of potentiometer 22 as well as the lamp voltage and current signals 180 and 182 is presented at the output of amplifier 186. Potentiometers 188 and 190 are adjusted so that the input to amplifier 186 is not affected until the lamp voltage or current has exceeded a predetermined level. The output of amplifier 186 is therefore a DC level which varies primarily in accordance with the setting of the intensity control 22. Capacitor 192 slows the response time of the amplifier 186 and thus prevents spurious input signals from affecting the output thereof.

The output of amplifier 186 is combined with that of ramp generator amplifier 172 through resistors 178, 194 and 196. Resistor 196 is made variable so that its effective resistance, together with that of resistor 194 is about equal to the resistance of resistor 178. Therefore, at node 198 the ramp voltage produced by amplifier 172 is added to the DC level generated by summing amplifier 186. This nodal voltage is then applied to the inverting input of amplifier 26. Also, another connection by conductor 200 is made to node 198, the effect of which will be described below in connection with the initial charging current of the filter capacitors 34 in the start up of the power converter.

It will also be assumed for the present discussion that light emitting diodes 202 and 204 are forward biased by the output pulses of the drive amplifier 26. The light intensity emitted by diode 202 provides a visual indication of the duty cycle operation of the FET drive circuit 12 described above. Light emitting diode 204 is encapsulated with a transistor 206 and is optically coupled thereto to provide a high degree of electrical isolation between the high voltage power generation circuit, and the low voltage control and drive circuits of the power converter. As a result of combining the ramp voltage of amplifier 172 with the DC voltage output of amplifier 186 as an input to amplifier 26, there are provided at the output of amplifier 26 a pulse train with a frequency of 120 hertz, and a duty cycle corresponding to the intensity control 22. This pulse train is illustrated as a dashed line in FIG. 3d. These pulses are coupled by the optical isolator diode 204 and drive transistor 206 to the FET power switch 12.

The collector of optical isolator transistor 206 is connected through a load resistor 208 to the supply voltage 98. The collector of transistor 206 is also connected to the inverting input of a comparator 210. The noninverting input of comparator 210 is biased at a voltage intermediate to the supply voltage 98 by resistors 212 and 214. Resistors 216 and 218 provide conventional feedback and biasing of the comparator 210. The output of the comparator 210 is connected by resistor 220 to the anode of diode 106, as well as to the gate terminals of FET power transistors 60–66 through respective resistors 108–114.

When transistor 206 is turned off, the supply voltage 98 is applied through resistor 208 to the noninverting input of comparator 210, whereupon the output of the comparator is driven to its lower voltage limit. The FET power transistors 60–66 then receive no drive voltage, and are thus cut off. When transistor 206 is driven into a conducting state by the forward biasing of diode 204, a low voltage will be applied to the inverting terminal of comparator 210. As a result, the output of the comparator 210 will be driven high, and the FET power transistors 60–66 will be driven into their conduction states.

In connection with a feature of the power converter, resistor 220 and a capacitor 222 form a low pass filter network for reducing the rise time and fall time of the pulses coupled to the FET power transistors 60–66. The control signal produced by resistor 220 and capacitor 222 is shown as the solid line waveform in FIG. 3d. Since FET transistors are transconductance devices, the rise and fall times of the drain-source currents is proportional to the input gate drive voltages. Thus, as the FET power transistors 60–66 conduct a controlled current, the filter capacitors, to be described below, will not be presented with an impulse of current. This has the effect of improving the lifetime of electrolytic filter capacitors. In the preferred form of the invention, the rise and fall rates of the FET power transistor drive pulses do not exceed about 10 volts per microsecond.

Referring to FIGS. 2a and 2b with regard to the full-wave rectifying diode bridge 32, the capacitor filter section 34, and the inventer 36. The 220 volt AC low terminal 46 is coupled to the anode of a diode 224 and the cathode of a diode 226. Conductor 228 connected to the diode bridge 10 couples switched AC power to the anode of diode 230 and the cathode of diode 232. Diodes 224, 226, 230 and 232 form the full-wave rectifying diode bridge 32. The cathodes of diodes 224 and 230 are connected in common to a large value filter capacitor 234 and smaller value coupling capacitor 236. The anodes of diodes 226 and 232 are comparably connected in common to capacitors 238 and 240. Capacitors 234 and 238 are the primary storage elements of power in the filter section 34. Large value resistors bridge each series-connected capacitor 236 and 240 to provide DC balance of leakage current.

110 volt AC mode operation is provided by NPN transistor 242 connected through base resistor 244 to an input terminal 246. The emitter of transistor 242 is grounded, while the collector is connected to the coil 248, and diode 252 prevents inductive voltage spikes from damaging the transistor 242. A pair of normally-open contacts 254 are associated with the relay 250, and are connected between the junction of series-connected filter capacitors 234 and 238, and the junction of diodes 224 and 226 of the bridge 232. When a logic high level is supplied to the input terminal 246, the transistor 242 conducts and the relay 250 is operated. It is understood that in the 110 V mode, the 220 V AC input is replaced with 110 V AC. The 110 V AC low input is thus applied through closed relay contacts 254 to the junction of series-connected filter capacitors 234 and 238. Thus, on the positive half cycles of the AC input, capacitor 234 will charge, and on the negative half cycle the capacitor 238 will be charged. Since the capacitors 234 and 238 are connected in series, and since one of the capacitors remains charged while the other is discharged in transferring power to the lamp 42, the composite action results in a voltage doubler. The filter capacitors 234 and 238 are of sufficient capacitance to supply the requisite energy to the lamp 42 during the half cycle when no charging current is flowing therein. As a result, the operation of the lamp is not compromised by the connection of 110 volt AC to the 220 volt input of the power converter.

As noted above, the diode bridge functions to maintain a charge, as determined by the position of the intensity control 22, on filter capacitors 234 and 238. Rectifying diode bridge 32 permits the unidirectional charging of capacitors 234 and 238 when the FET power switches 60–66 and bridge 10 switch the hot side of the 220 volt AC power source to the bridge 32. The bridge 32 rectifies the 220 volt AC current and charges capacitors 234 and 238 according to their polarizations indicated in FIG. 2b. Capacitors 236 and 240 are also initially charged to the voltage appearing across the diode bridge 32, but are alternately discharged as described below. It is important to understand that the voltage appearing across the bridge 32, and thus across the series-connected capacitors 234 and 238 is proportional to the duration that the FET power switches 60–66 are in a conduction state. The longer the period of time FET power switches 60–66 conduct during each half of the input AC cycle, the higher will be the capacitor charge. As a result, if it is desired to increase the intensity of the lamp 42, the intensity control 22 is increased, the FET power switches 60–66 will remain conducting for a longer period of time during the AC cycle and as a result the capacitors 234 and 238 will be charged to a higher voltage.

In accordance with the invention, the energy stored by the capacitor filter 34 is converted to a high frequency alternating current power before being transferred to the lamp 42. An oscillator 38 and inverter 36 are effective for converting the charge stored in the capacitor filter 34 to the higher AC frequency power. The oscillator 38 is an integrated circuit identified as integrated circuit type 3420, manufactured by the Motorola Company. The oscillator 38 provides 20 kilohertz outputs 256 and 258, each 180 degrees out of phase with the other. Various resistors and capacitors are connected to the oscillator 38 for achieving the noted frequency. A potentiometer 260 is provided for adjusting the time period in which each oscillator phase 256 and 258 is in the same logic low state (termed deadtime). This will be described in more detail below.

The output of oscillator phase one 256 is connected in common to the bases of an NPN transistor 262 and a PNP transistor 264. The collector of transistor 262 is connected to the base thereof by a biasing resistor 266. The collector of transistor 262 is also connected to a positive voltage supply. The emitters of transistors 262 and 264 are connected in common and to a first terminal of a coupling capacitor 268. The remaining terminal of the coupling capacitor 268 is connected in series to a primary winding of transformer 270. The other terminal of the primary of transformer 270 is connected to a voltage supply. The capacitor 268 prevents DC magnetization of the transformer 270. A resistor 272 is connected across the secondary of the transformer. One terminal of the secondary is connected to a parallel combination of a resistor 274 and the cathode of a diode 276. The remaining terminals of the resistor 274 and diode 276 are connected together and to the base of an NPN transistor switch 278. Connected between the collector and emitter of the transistor switch 278 is a diode 280. The collector of transistor switch 278 is connected to the plate of coupling capacitor 236 and filter capacitor 234 which, in turn, are connected to the cathodes of rectifier bridge diodes 230 and 224. The emitter of transistor 278 is connected to the other terminal of the secondary of transformer 270.

The transformer 40 provides the means for coupling the stored energy from the capacitor filters 234 and 238 to the lamp 42. The primary of the transformer 40 is connected between the emitter of transistor 278 and the junction of the series-connected coupling capacitors 236 and 240. The input signal to the primary of transformer 40 is shown in FIG. 4. The secondary of transformer 40 is connected across the terminals of the lamp 42. In order to prevent damage to the transformer 40 in the event the lamp 42 burns out, or is removed during operation of the power converter, resistors 282 and 284 are connected between the terminals of the transformer 40 secondary to ground. A resistor and capacitor network 286 is bridged across the primary of transformer 40 to suppress transients.

The drive circuitry connected between phase two output 258 of the oscillator 38 and the capacitor filter circuit 34 are comparably connected to that described above so that the primary of transformer 40 is driven in a push-pull fashion. Hereinafter, when the various components of the circuit associated with phase two output 258 of the oscillator 38 are described, a reference character identical to the corresponding component of phase one will be utilized, except with a primed notation.

The drive circuitry of the oscillator functions as follows. When the phase one output 256 of the oscillator 38 is driven to a logic high, NPN transistor 262 is driven into conduction and PNP transistor 264 is cut off. As a result, current flows through transistor 262 and charges coupling capacitor 268. The charging current of capacitor 268 induces a current in the primary of transformer 270, which current is coupled to the secondary as a voltage which turns on transistor switch 278. When transistor switch 278 conducts, the primary of transformer 40 is essentially connected in parallel across capacitor 236. Capacitor 236 thus discharges through the primary of transformer 40, and transfers energy into the secondary thereof to the lamp 42. For the present purposes, it should be assumed that on the previous cycle of the push-pull operation of transformer 40, the transistor 278' has conducted and discharged coupling capacitor 240 through the transformer in an opposite direction. Accordingly, the discharge of capacitor 236 through transistor switch 278 and primary of transformer 40 charges coupling capacitor 240. The push-pull charging of capacitors 236 and 240 through respective transistors 278' and 278 comprises the conventional half bridge configuration. With the noted configuration, the transformer 40 does not become magnetized by DC currents occurring as a result of unequal current flow through transistors 278 and 278'.

During the positive cycle of phase one output 256 of the oscillator 38, the phase two output 258 is at a logic low. This drives PNP transistor 264' into conduction and causes capacitor 268' to charge with a polarity opposite that of capacitory 268. As a result, current flows in the primary of transformer 270' in a direction opposite that of transformer 270, whereupon the voltage of the secondary of transformer 270' is a polarity which does not drive transistor switch 278' into conduction. The net effect of the signal on the phase two output 258 is to charge capacitor 268' in the direction indicated. When the oscillator 38 forces a phase reversal on the outputs 256 and 258, capacitor 268' is charged in the opposite direction, thereby driving a oppositely-directed current through the primary of transformer 270'. The secondary of transformer 270' then drives transistor switch 278' into conduction, and the energy stored in capacitor 240 is discharged to the primary of transformer 40. Again, the secondary of transformer 40 couples the capacitor energy to the lamp 42.

As noted above, the potentiometer 260 is adjustable to provide a desired time in which the phase one and phase two outputs 256 and 258 of the oscillator 38 are both at a logic low state. The time in which this common logic state occurs between the phase outputs 256 and 258 is coincident with the transistion times of the phases. With this common off time, it is assured that both transistors 278 or 278' are nonconducting. This assures that both transistors 278 and 278' will not be conducting simultaneously, thereby shorting the capacitor filter section 34 and damaging the transistors 278 and 278'. This is especially advantageous when switching power transistors, such as transistors 278 and 278', where the charge stored in the base regions of the transistors can maintain collector-emitter conduction for a short period of time after the base drive has been removed. The common off time of transistors 278 and 278' is illustrated as the zero voltage level in FIG. 4.

Various other features of the invention are shown in FIGS. 2a and FIG. 2b. For example, a pair of amplifiers 286 and 288 are provided for driving an enable input 290 of the oscillator 38. The inverting input of the amplifiers 286 and 288 are biased by divider resistors 292 and 294. The noninverting input of amplifier 286 is connected to the junction point of a series-connected resistor 296 and capacitor 298. The other terminals of the resistor 296 is connected to a positive voltage supply, while the capacitor is connected to ground. Thus, when the supply voltage is initially applied to the power converter, the voltage across the capacitor 298 is low, and the output of amplifier 286 is a logic low. This inhibits the operation of the oscillator until stable circuit voltages have been established.

The output of amplifier 286 is also connected to series resistors 300 and 302 to the supply voltage. The junction of the series resistors 300 and 302 is connected to the base of a PNP transistor 304. The collector of transistor 304 is connected to ground through a capacitor 306 which is in parallel with a discharge resistor 308. Capacitor 306 is significantly larger than capacitor 298. When capacitor 298 has charged to a voltage greater than that existing on the inverting input of amplifier 286, the output of the amplifier 286 will switch to a logic high, thereby enabling the input 290 of the oscillator 38. Oscillator 28 is of the type in which the voltage on input terminal 310 is inversely proportional to the duty cycle of the phase outputs 256 and 258. When capacitor 306 has been charged by transistor 304 to the supply voltage, the phase outputs 256 and 258 have very short duty cycles. Because the logic high output of amplifier 286 forces transistor 304 into a cut off state, the capacitor 306 discharges through resistor 308. During the discharge of capacitor 306 the voltage on oscillator input 310 decrease, thereby increasing the duty cycle of the phase outputs 256 and 258. With this arrangement, a "soft start" of the power converter is provided, and the currents through the power generation and conversion circuits slowly increase. This is particularly important in driving transformers to reduce core magnetization due to nonsymmetrical transients during start up of the power converter. The operation of amplifier 288 in connection with the oscillator 38 will be described in detail below.

Circuit module 312 of current and voltage monitor 44 is a conventional undervoltage and overvoltage detector. Circuit 312 is identified as integrated circuit type 3425, manufactured by Motorola. The circuit module 312 has an undervoltage input 314 and an overvoltage input 316 which are associated with the power parameter associated with the lamp 42. Undervoltage input 314 is connected to series resistor 318 which, in turn, is connected to the cathode of a diode 320. The anode of diode 320 is inductively coupled to the lamp conductor 322 by a plurality of windings 324. The windings 324 are responsive to the magnitude of current flowing in lamp 42 to produce an alternating voltage across shunt resistor 326. Diodes 320 and 328 are connected to the winding 324 in a halfwave doubler manner. Capacitors 330 and 332 are connected in series to the diodes 320 and 328, and to the winding 324 to provide a voltage doubling function. As a result, the voltage appearing across capacitors 330 and 332 is representative of the magnitude of the current flowing in lamp 42.

When the voltage across the series-connected capacitors 330 and 332 is above a predetermined level, the, input 314 of the circuit module 312 is triggered. In response to the high voltage on input 314, circuit 312 produces a high voltage on output 334 which indicates that some current is flowing in the lamp 42. Essentially then, a high output at 334 is used to indicated that the bulb 42 is inserted in the socket, and that the filament thereof is not burned out. Resistor 336 and a potentiometer 338 are connected in parallel across the capacitors 330 and 332. Overvoltage input 316 is connected to the wiper of potentiometer 338, and senses an overcurrent condition for the current through the bulb 42. An overvoltage condition at input 316 produces a high voltage on output 340 of the circuit 44. When output 340 is driven high, diode 342 is forward biased, signifying excessive current through the filament of the lamp 42.

The cathode of diode 342 is connected to the inverting input of an amplifier 344 which processes indications of short circuits within the power converter. To that end, the transistor 100 of optical isolator 94 is also coupled to the input of amplifier 344 to indicate overcurrent conditions existing within the FET power transistors 60-66. On an indication of overcurrent within the lamp 42 or the FET power transistors 60-66, the output of amplifier 344 is driven to a logic low. Once so triggered, the connection of diode 346 and resistor 348 maintain the amplifier 344 in a latched state. Light emitting diode 349 is then illuminated to provide a visual indication of an overcurrent condition in the power converter 8.

The output of amplifier 344 is connected to the inverting input of amplifier 350 through diode 352. As a result of the latched output low of amplifier 344 being coupled to amplifier 350, the output of the latter will be driven to a high level. The output high voltage of amplifier 350 prevents the forward biasing of optical isolator diode 204, thereby preventing the FET drive signal from being coupled to the FET power switch section 12. An indication of an overcurrent condition can be monitored on test point 354. In the actual operation of the power converter, a processor (not shown) is connected to the "short" output 354 to ascertain whether the power converter has experienced an overcurrent condition. This will be explained more thoroughly below. In addition to the foregoing, the latched low voltage on the output of amplifier 344 is coupled to the oscillator section amplifier 288. The low voltage on the noninverting terminal of amplifier 288 causes the output thereof to be driven to a low voltage, thereby disabling the oscillator 38. Again, because the oscillator 38 is disabled, transistors 278 and 278' are not driven and thus AC power cannot be converted from the capacitor section 34 into AC power for the lamp 42.

For additional protection of the circuitry of the power converter, there is provided a normally closed heat sink thermal switch 356 connected between a "Lamp On" input 355 and the output 357. The thermal switch 356 is physically situated on the heat sink to which the FET power transistors 60-66 are mounted. In the event that one or more of the transistors 60-66 exceed their power ratings, the temperature of the heat sink (not shown) will increase. Depending upon the particular temperature range of the thermal switch 356 chosen, when the heat sink temperature rises above a predetermined level, the switch 356 will open, and a voltage applied to the Lamp On input 355 will not be coupled to the LPS $\overline{OT}$ output 357. Resistor 359 pulls the monitor point 357 to a low. In the preferred embodiment of the invention, the heat sink switch opens upon reaching a temperature of 160° F.

The input 355 also provides a reset input for the amplifier 344 when in a latched condition. Typically the amplifier is connected between +15 volts DC and ground. The input to the noninverting terminal is thus at about +7.5 volts, upon an overcurrent in the lamp 42, the monitor 44 provides a voltage greater than +7.5 volts to the inverting input of amplifier 344, thereby latching its output low as described above. When latched, the noninverting input is pulled down to a voltage of about two volts. When it is desired to reset the amplifier 344, a logic low is applied to the "Lamp On" input 355, and then a reset is effected if the overcurrent condition is no longer present.

Returning to the current and voltage monitor circuit 44, a buffer amplifier 358 is connected so as to respond to excessive currents in the filament of the lamp 42. The output of the buffer amplifier 348 is connected to the conductor 182 of the summing network 20, as described above. Should an overcurrent be detected in the filament circuit of the lamp 42, the output of amplifier 348 will be driven to a low voltage, thereby influencing the voltage at summing input of amplifier 186. As a result, the duty cycle of the driving pulses coupled to the FET power transistors 60–66 will be decreased.

The cathodes of a pair of diodes 360 and 362 are each connected to a terminal of the lamp 42. There appears on the anodes of the diodes 360 and 362 a fullwave rectified representation of the filament voltage at the lamp 42. The negative half cycles of the rectified voltage are filtered by capacitor 363 and then coupled to the summing amplifier 186 through conductor 180. The representation of the lamp voltage is summed with the voltage of the intensity control 22. The lamp voltage is used in conjunction with previously described control signals to provide pulses from the drive section of the converter 8. These pulses have the requisite duty cycle for maintaining the FET power switch 12 conductive for a time sufficient to charge the capacitor filter 34 to the desired voltage. When an excessive voltage is applied to the filament of the lamp 42, the negative voltage on conductor 180 overrides the other voltages present at node 184, thereby decreasing the duty cycle of the FET power transistors 60–66 and reducing the overvoltage condition.

The power converter 8 of the invention is also provided with a circuit which is active during an initial start up for controlling the FET power switch 12 to charge the capacitor filter 34 at a controlled rate. This circuit comprises an amplifier 364, the output of which is coupled to node 198 of the summing network 20. A large value capacitor 366 is connected between a voltage supply and the Lamp On input 355. Thus, when logic high (+5 V) is applied to input 355 the capacitor 366 charges. This provides an initial high voltage to the noninverting input of amplifier 364. However, since the logic +5 V is applied to the input of amplifier 344, it does not exceed the +7.5 V on the noninverting input of amplifier 344 and thus force it into a latched condition indicative of an overcurrent.

During charging of capacitor 366, the output of amplifier 364 is driven to a high voltage, thereby overriding the voltage otherwise existing at node 198. As a result, the duty cycle of the pulses produced by amplifier 26 is reduced, and the FET power switch 12 is made conductive during a period of the AC cycle which is shorter than normally desired for the load. The capacitors 234, 236, 238 and 240 are thereby initially charged at a controlled rate. As the capacitor 366 continues charging, the voltage at the noninverting input of amplifier 364 is gradually reduced, and the overriding effect of the output of amplifier 364 on node 198 is correspondingly reduced. When capacitor 366 becomes fully charged, the output of amplifier 364 is reduced to a low voltage. Diode 368 then essentially isolates node 198 from the amplifier 364.

From the foregoing, it may be seen that power converter 8 overcomes the shortcomings of the prior art inverters noted above. The power converter 8 according to the present invention improves the efficiency and reliability of the converter circuits by synchronizing the FET power switch with the AC input power, such that the power transistors are turned on during the zero crossings of the AC cycle. Overvoltage and overcurrent protection are provided directly to the FET transistors of the power switch. In the preferred embodiment of the invention, the power converter 8 drives a tungsten lamp, the brightness of which is adjusted by an intensity control. A power switch drive circuit is provided and is responsive to the intensity control for driving the FET power switches with a duty cycle sufficient to provide the desired power to the lamp. The FET power switch controls the charging of a capacitor filter section by the AC input power. A 20 kilohertz oscillator and an inverter convert the power stored by the filter capacitors into a 20 kilohertz signal for driving the lamp 42. The filament current and voltage of the lamp are monitored to verify that the operational parameters are well within limits. The voltage of the lamp filament is fed back and combined with the voltage indicative of the intensity control to form a closed loop control system for assuring that the desired lamp brightness is produced. Various other circuits perform precautionary measures such as monitoring various circuit currents and temperatures, and providing appropriate drive signals on start up of the power converter.

It should be understood that the foregoing is only illustrative of the principles and concepts of the invention as applied to a power converter for driving an incandescent lamp. However, those skilled in the art may apply these concepts to other circuits to realize the advantages thereof.

Although one embodiment of the invention has been illustrated in the accompanying Drawings and described in the foregoing Detailed Description, it will be understood that the invention is not limited to the embodiment disclosed, but is capable of numerous rearrangements, modifications and substitutions of parts and elements without departing from the scope of the invention.

What is claim is:

1. A power converter for controlling alternating line power for transfer to a load, comprising.
   a phase lock loop circuit connected to receive said line power and generate a sequence of pulses at zero crossovers of said line power,
   a ramp voltage generator having each ramp segment initiated by one of said pulses,
   means for generating an input signal for selecting the amplitude of power delivered to said load,
   means for comparing said ramp signal to said input signal to produce said control signal having an active state which is initiated at said zero crossovers and is terminated upon a comparison of said ramp signal to said input signal, a power switch responsive to said control signal for conducting said line power therethrough during the active states of said control signal, and means for transferring said line power conducted through said switch to said load.

2. A method for applying line power to a load comprising the steps of:

generating a pulse at each zero crossover of said line power by phase locking to said line power, generating a ramp signal which is repetitively initiated by said pulses, generating an input signal for determining the amplitude of power applied to said load, comparing said input signal to said ramp signal for producing a control signal which is initiated at said zero crossover and is terminated at an equal comparison of said input signal and said ramp signal, conducting said line power through a power switch during the active states of said control signal, and applying said line power, which is conducted through said power switch, to said load.

3. A power converter for transforming alternating line power into higher frequency driving power for a load, comprising:

a phase locked loop connected to receive said line power and generate a sequence of pulses at zero crossovers of said line power, a ramp voltage generator having each ramp segment initiated by one of said pulses, means for generating an input signal for selecting the amplitude of power delivered to said load, means for comparing said ramp signal to said input signal to produce said control signal having an active state which is initiated at said zero crossovers and is terminated upon a comparison of said ramp signal to said input signal, a power switch responsive to said control signal for conducting said line power therethrough during the active states of said control signal, means for rectifying said line power conducted through said switch, means for storing said rectified line power to produce DC power, means for switching said DC power at a frequency substantially higher than that of said alternating line power to produce a high frequency power signal, and a transformer for receiving said high frequency power signal at the primary terminals thereof and producing a different voltage power signal at the secondary terminals thereof for driving said load.

* * * * *